United States Patent
Kuroishi et al.

(10) Patent No.: US 7,844,694 B2
(45) Date of Patent: Nov. 30, 2010

(54) COMMUNICATION SYSTEM, RELAY APPARATUS, RELAY METHOD AND COMPUTER READABLE MEDIUM

(75) Inventors: Kenji Kuroishi, Ebina (JP); Kazuaki Watanabe, Ebina (JP); Seigo Makida, Ashigarakami-gun (JP); Kazuhiko Narushima, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 83 days.

(21) Appl. No.: 12/100,680

(22) Filed: Apr. 10, 2008

(65) Prior Publication Data
US 2009/0083427 A1  Mar. 26, 2009

(30) Foreign Application Priority Data
Sep. 26, 2007  (JP)  ............... 2007-250182

(51) Int. Cl.
*G06F 15/173* (2006.01)
(52) U.S. Cl. ............... 709/223; 709/203; 709/217; 709/224
(58) Field of Classification Search .......... 709/203, 709/217, 219, 223, 224
See application file for complete search history.

(56) References Cited

U.S. PATENT DOCUMENTS

| | | | | |
|---|---|---|---|---|
| 7,120,927 B1 * | 10/2006 | Beyda et al. | ............... | 726/2 |
| 7,206,088 B2 * | 4/2007 | Tanimoto | ............... | 358/1.15 |
| 2001/0044819 A1 * | 11/2001 | Gong | ............... | 709/202 |
| 2002/0073182 A1 * | 6/2002 | Zakurdaev et al. | ............... | 709/220 |
| 2002/0143957 A1 * | 10/2002 | Tanimoto | ............... | 709/227 |
| 2003/0143957 A1 * | 7/2003 | Lyon | ............... | 455/67.1 |
| 2004/0210667 A1 * | 10/2004 | Fukasawa et al. | ............... | 709/231 |

FOREIGN PATENT DOCUMENTS

JP  2004-110695 A  4/2004

* cited by examiner

*Primary Examiner*—Lashonda T Jacobs
(74) *Attorney, Agent, or Firm*—Sughrue Mion, PLLC

(57) ABSTRACT

The communication system includes: an apparatus that mounts a processing unit which executes transmission and reception of a signal with an external apparatus and which processes the received signal; and a relay apparatus that relays transmission and reception of a signal between the external apparatus and the apparatus. The relay apparatus is provided with: a transmission and reception unit that receives a signal from the external apparatus and transmits a signal to the external apparatus; an analysis unit that analyzes whether or not the signal received by the transmission and reception unit is a signal to be processed by the processing unit of the apparatus; and a determination unit that determines whether or not to execute transfer processing of the received signal to the apparatus based on a result of the analysis by the analysis unit.

14 Claims, 7 Drawing Sheets

FIG.3

| OUTPUT PORT | MAC ADDRESS | PORT NUMBER OF TCP | | |
|---|---|---|---|---|
| | | TRANSFER | SUBSTITUTIVE RESPONSE | DISCARD |
| No.1 | A1-B1-C1-D1-E1-F1 | 1a,2a,3a,5a, 6aa,7aaa | 8a,1aa,2aa,4aaa | 3aa~4aa,7aa~1aaa |
| No.2 | J2-H2-J2-K2-L2-M2 | 1b,6b,7b,9b, 5bb,8bbb | 8b,1bb,2bb,4bbb | 3bb~4bb,6bb~1bbb |
| No.3 | n3-p3-q3-s3-t3-u3 | 2c,4c,6c,9c, 4cc,6ccc | 5c,2cc,3cc,7ccc | 5cc~8cc,3ccc~5ccc |

COMMUNICATION SYSTEM, RELAY APPARATUS, RELAY METHOD AND COMPUTER READABLE MEDIUM

CROSS REFERENCE TO RELATED APPLICATIONS

This application is based on and claims priority under 35 USC §119 from Japanese Patent Application No. 2007-250182 filed Sep. 26, 2007.

BACKGROUND

1. Technical Field

The present invention relates to a communication system, a relay apparatus, a relay method and a computer readable medium storing a program.

2. Related Art

Generally, an apparatus such as for example a printer connected to a network is provided with an operational mode setting the apparatus in an electric power saving state. Among these, there is also an apparatus provided with an operational mode cutting electric power supply to a circuit unit that controls communication with a network when a signal is not received during a predetermined time.

SUMMARY

According to an aspect of the invention, there is provided a communication system including: an apparatus that mounts a processing unit which executes transmission and reception of a signal with an external apparatus and which processes the received signal; and a relay apparatus that relays transmission and reception of a signal between the external apparatus and the apparatus. The relay apparatus is provided with: a transmission and reception unit that receives a signal from the external apparatus and transmits a signal to the external apparatus; an analysis unit that analyzes whether or not the signal received by the transmission and reception unit is a signal to be processed by the processing unit of the apparatus; and a determination unit that determines whether or not to execute transfer processing of the received signal to the apparatus based on a result of the analysis by the analysis unit.

BRIEF DESCRIPTION OF THE DRAWINGS

Exemplary embodiment(s) of the present invention will be described in detail based on the following figures, wherein:

FIG. 3 is a diagram illustrating one example of the communication history information stored in the communication history information memory and associated with the MAC address of the image forming apparatus connected to each output port;

DETAILED DESCRIPTION

Exemplary embodiments of the present invention will be described in detail below with reference to the accompanying drawings.

Figure 1:
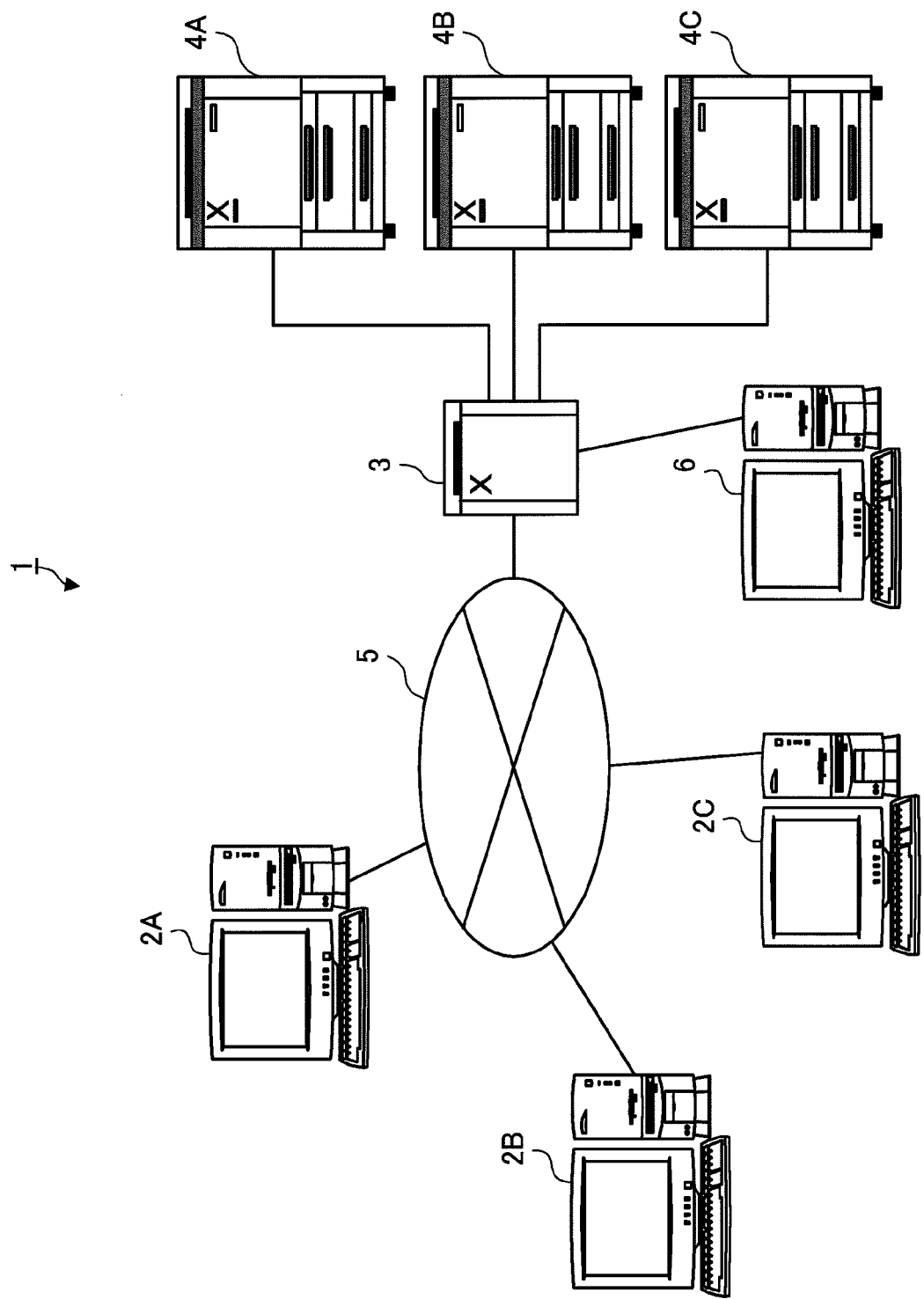
FIG. 1 is a schematic view illustrating an entire configuration of a communication system according to the exemplary embodiment.

FIG. 1 is a schematic view illustrating an entire configuration of a communication system 1 according to the exemplary embodiment. In the communication system 1 shown in FIG. 1, terminal apparatuses 2A to 2C (hereinafter, also generally referred to as "a terminal apparatus 2") which are installed, for example, in a work space (e.g., desk) of a user or the like, and image forming apparatuses 4A to 4C (hereinafter, also generally referred to as "an image forming apparatus 4") such as printers or the like, which execute printing processing of image data generated in the terminal apparatus 2 on a medium such as a recording paper, are relayed to a hub 3 as one example of a relay apparatus (relay unit), and connected via a network 5 as one example of a communication unit so as to bi-directionally communicate with each other. Here, as the network 5, for example, a communication line, LAN (Local Area Network), WAN (Wide Area Network), the Internet or the like is used. The communication line may also include a telephone line and a satellite communication line (e.g., spatial transmission line in digital satellite broadcasting).

Further, the hub 3 is connected with a terminal apparatus 6 for inputting various settings to the hub 3.

Note that the communication system 1 according to the present exemplary embodiment shown in FIG. 1 illustrates a configuration as one example in which three terminal apparatuses 2A to 2C are connected to the network 5 and three image forming apparatuses 4A to 4C are connected to the hub 3 respectively. However, an apparatus connected to the hub 3 is not limited to the image forming apparatus 4. Any apparatus may be connected, if the apparatus processes a signal transmitted via the network 5, such as, for example, a personal computer (PC).

As the terminal apparatus 2, for example, a personal computer (PC) is used, and image data including a document, a figure, a photograph and the like are generated and stored. When printing the generated image data and the stored image data, the terminal apparatus 2 converts the image data into a print job that is a print command to any of the image forming apparatuses 4A to 4C, and outputs it. The data which constructs this print job (print job data) is configured by including not only the image data but also attribute data that is information for setting various print functions and designating of any of the image forming apparatuses 4A to 4C which executes printing.

The print job outputted from the terminal apparatus 2 is transmitted to the hub 3 via the network 5, is relayed to the hub 3, and is transferred to any of the image forming apparatuses 4A to 4C.

The hub 3 in the present exemplary embodiment receives a signal which is transmitted via the network 5. The hub 3 has a function of analyzing information contained in the received signal and executing processing corresponding to the analyzed result, for the received signal. Specifically, corresponding to the analyzed result for the received signal, the hub 3 executes any of processing of transferring the received signal to an apparatus connected to the hub 3 such as the image forming apparatus 4, processing of executing a substitutive response as a substitution of the image forming apparatus 4 without transferring it, and processing of discarding the received signal.

That is, the hub 3 analyzes information contained in the received signal. As a result of this, if the received signal is determined to be a signal which is necessary to be processed in the image forming apparatus 4 or the like connected to the hub 3, such as the print job in which any of the image forming apparatus 4 transmitted from the terminal apparatus 2 is designated as an output destination, the hub 3 executes transfer processing for it to the designated image forming apparatus 4 or the like. Further, if the received signal is determined that executing the substitutive response is possible by a substitution of, for example, the image forming apparatus 4 or the like, the hub 3 does not transfer it to the image forming apparatus 4 or the like, and the hub 3 executes response processing for the received signal. Furthermore, if the received signal is determined to be a signal unnecessary to be processed in, for example, the image forming apparatus 4 or the like, the hub 3 executes discard processing of the received signal.

Thus, the hub 3 executes the above-described analysis and the processing corresponding to its result with respect to the received signal, and transfers the only signal which is necessary to be processed in an apparatus such as the image forming apparatus 4 or the like connected to the hub 3 to such the apparatus.

Figure 2:
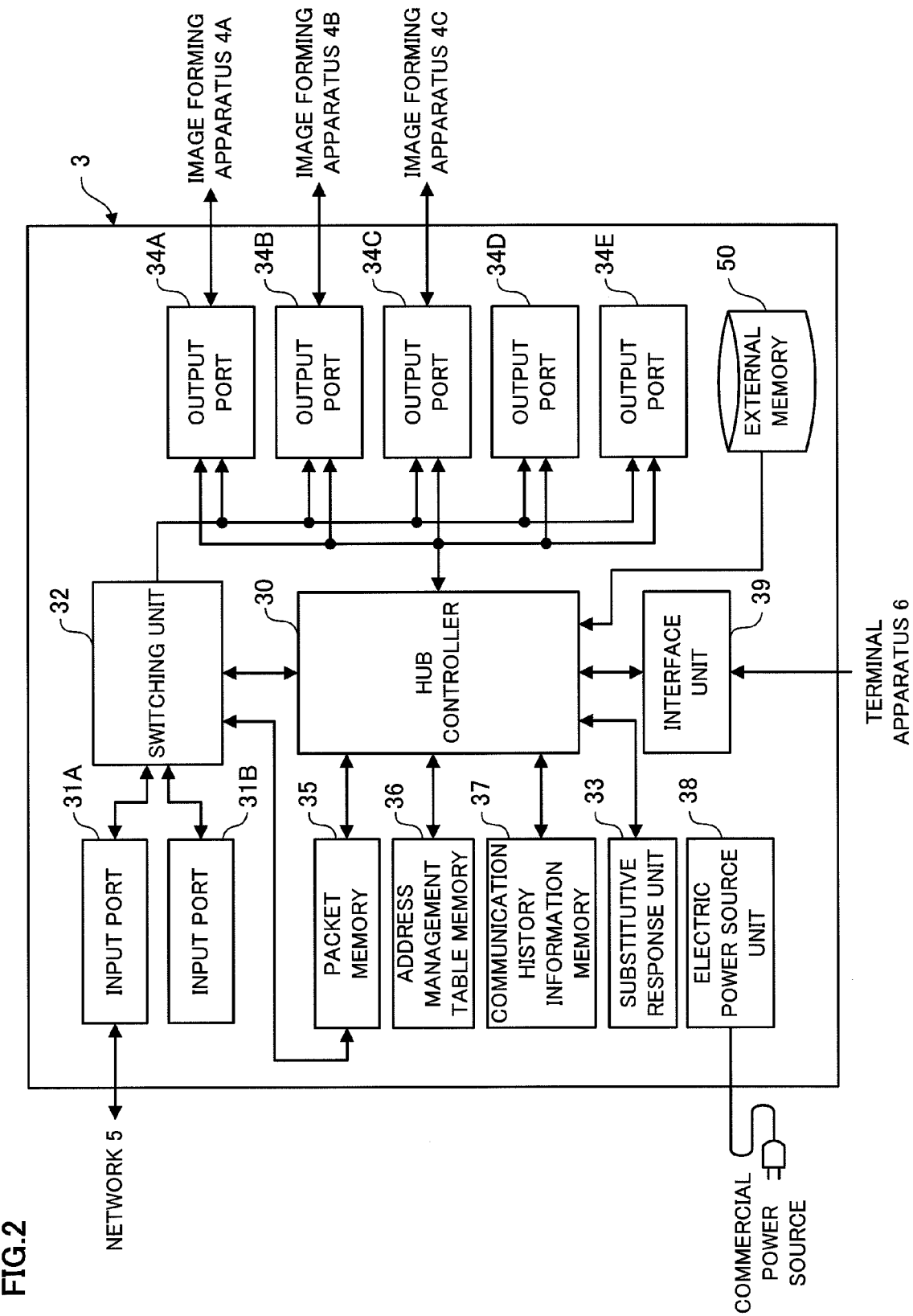
FIG. 2 is a block diagram illustrating a functional configuration of the hub.

FIG. 2 is a block diagram illustrating a functional configuration of the hub 3. As shown in FIG. 2, the hub 3 includes a hub controller 30, plural input ports 31A and 31B (hereinafter, also generally referred to as "an input port 31"), a switching unit 32, a substitutive response unit 33, plural output ports 34A, 34B, 34C, 34D and 34E (hereinafter, also generally referred to as "an output port 34"), a packet memory 35, an address management table memory 36, a communication history information memory 37, an electric power source unit 38, an interface unit 39 and an external memory 50.

The input ports 31A and 31B are one example of the transmission and reception unit that executes transmission and reception to/from the network 5, and are connected to the network 5 through a communication line such as a LAN cable. The input ports 31A and 31B receive various signals which are transmitted from the network 5, such as the print job from, for example, the terminal apparatus 2. Further, the input ports 31A and 31B transmit various signals to an external apparatus connected to the network 5, such as, for example a personal computer (PC). Note that, in the description below, the various signals received by the input port 31 are also referred to as "a packet".

The switching unit 32 transmits the packet received by the input port 31 to the hub controller 30 and the packet memory 35. In the packet memory 35, the received packet is stored. Further, the switching unit 32 transmits the packet stored in the packet memory 35 to the output port 34 instructed by the hub controller 30.

The substitutive response unit 33 is a function unit that generates a packet for which the hub 3 executes the substitutive response as a substitution for an apparatus such as the image forming apparatus 4 or the like. When the substitutive response unit 33 executes the substitutive response, the substitutive response unit 33 transmits a substitutive response signal to the network 5 via the input port 31.

To the output ports 34A to 34E, apparatuses such as the image forming apparatus 4 and the like are connected via a communication line such as a LAN cable. In accordance with control by the hub controller 30, the output ports 34A to 34E transmit the packet received by the input port 31 and stored in the packet memory 35, to the image forming apparatus 4.

Further, in the communication system 1 according to the present exemplary embodiment, the network 5 shall be connected to the input port 31A. Furthermore, to the output ports 34A, 34B and 34C, the image forming apparatuses 4A, 4B and 4C shall be connected, respectively.

The electric power source unit 38 converts 100 V supplied from a commercial power source to, for example, 12 V, 5 V or the like to supply driving electric power to each function unit in the hub 3.

The interface unit 39 controls communication with the terminal apparatus 6 for inputting a processing condition or the like that is set by a user (e.g., a manager or the like of the communication system 1) to the hub 3 at execution of the above-described processing to the packet received by the hub 3. The communication with the terminal apparatus 6 is executed according to, for example, a communication rule such as HTTP (Hyper Text Transfer Protocol) and SNMP (Simple Network Management Protocol), or a standard such as RS232C.

The external memory 50 is realized by, for example, a HDD (Hard Disk Drive), and a processing program or the like is stored therein.

Next, the function of the hub controller 30 will be described.

The hub controller 30 acquires the packet received by the input port 31 from the switching unit 32 to analyze information contained in the acquired packet.

First, the hub controller 30 analyzes the information contained in the packet to determine the output port 34 that is a transmission destination of the packet. The hub controller 30 executes the determination of the output port 34 which is the transmission destination based on, for example, an MAC (Medium Access Control) address contained in the MAC header of the packet as one example of the information contained in the packet. That is, in the address management table memory 36 which is one example of a memory, an address management table is stored. The address management table is one example of correspondent relation information representing correspondent relation between the MAC address of the image forming apparatus 4 connected to each output port 34 and the output port 34. Accordingly, in the address management table memory 36, correspondent relation information indicating that each image forming apparatus 4 of a MAC address is connected to the corresponding output port 34 is managed. Thereby, the hub controller 30 refers to the address management table of the address management table memory 36, and determines the output port 34 that is the transmission destination based on the MAC address contained in the received packet.

The address management table stored in the address management table memory 36 is generated, for example, as follows. The hub controller 30 receives, for example, an ARP (Address Resolution Protocol) packet which is transmitted from the image forming apparatus 4, an IP (Internet Protocol) address requirement packet to a DHCP (Dynamic Host Configuration Protocol) server connected to the network 5 or the like, when the image forming apparatus 4 is connected to the output port 34 or for each predetermined time for example, and acquires an MAC address contained therein. The hub controller 30 associates the acquired MAC address with the output port 34 connected with the image forming apparatus 4 to automatically generate the address management table. The hub controller 30 transmits the generated address management table to the address management table memory 36 to store the address management table.

Further, correspondent relation between the specific output port 34 and the specific MAC address may be added to the address management table by a manager or the like of the communication system 1. In this case, the added correspondent relation is inputted from the terminal apparatus 6 connected to the hub 3.

Next, the hub controller 30 analyzes the information contained in the received packet and processes the packet in accordance with the analyzed result. That is, the hub controller 30 functions as an analysis unit that executes analysis of the received signal and a determination unit that determines processing to be executed to the received signal, together with the communication history information memory 37 which will be described in detail later.

Specifically, the hub controller 30 analyzes given data contained in the received packet. As a result of the analysis, if the received packet is determined to be one that is necessary to be processed in the image forming apparatus 4 or the like connected to the hub 3, the hub controller 30 executes the transfer processing of the received packet to the image forming apparatus 4. Further, if the received packet is determined to be one for which the substitutive response by an substitution for the image forming apparatus 4 is possible, the hub controller 30 does not transfer it to the image forming apparatus 4 and the hub executes the response processing for the received packet. Furthermore, if the received packet is determined to be a packet for which any processing is not required in the image forming apparatus 4 and the substitutive response is not required, the hub controller 30 executes the discard-processing of the received packet.

Note that the packet that is necessary to be processed in the image forming apparatus 4 or the like refers to, for example, a packet which is processed by a CPU (Central Processing Unit) that executes processing of calculation or the like when the operation of the image forming apparatus 4 or the like is controlled.

The analysis of the information contained in the packet here is executed based on, for example, a port number contained in a TCP (Transmission Control Protocol) header of the packet as one example of the information contained in the packet.

That is, the port number of the TCP designates one of programs running on a computer as a communication partner. Thus, if the packet (including broadband packet and multicast packet) transmitted to the specific image forming apparatus 4 is one that has been previously subjected to program processing such as print processing in the image forming apparatus 4, other packet containing the same port number as the port number of the TCP contained in the packet is one that is subjected to the program processing in the image forming apparatus 4. Thus, a packet containing such the TCP port number is determined to be one that is necessary to be transferred to the image forming apparatus 4.

Further, if a packet transmitted to the specific image forming apparatus 4 is one that has not been previously subjected to the program processing such as the print processing or the like in the image forming apparatus 4, but one for which some kinds of responses have been executed, other packet containing the same port number as the port number of the TCP contained in the packet is one that is not necessary to be subjected to the program processing in the image forming apparatus 4 but is determined to be one for which the response is required. Thus, the packet containing such the port number of the TCP is determined to be one for which the substitutive response is executed by the hub 3.

On the other hand, if a packet transmitted to the specific image forming apparatus 4 is one that has not been previously subjected to any program processing in the image forming apparatus 4, and for which any response has not been executed, other packet containing the same port number as the port number of the TCP contained in the packet is an unnecessary packet for which any processing is not required in the image forming apparatus 4. Accordingly, it is determined that the packet containing such the port number of the TCP may be discarded.

In order to execute the above-described determination, if the hub controller 30 receives a packet containing a port number of a new TCP, the hub controller 30 transmits the packet to the image forming apparatus 4 which is the transmission destination to grasp the situation of the processing in the image forming apparatus 4. Then, the hub controller 30 classifies the new port number into "a port number of a TCP which has been subjected to the program processing in the image forming apparatus 4", "a port number of a TCP which has not been subjected to any program processing but which some kinds of response is executed for the packet with" and "a port number of a TCP which has not been subjected to any program processing, and which any response has not been executed for the packet with" respectively, and stores them as communication history information for each image forming apparatus 4 connected to each output port 34. In such a case, these of the communication history information are stored in the communication history information memory 37 in association with the MAC address of the image forming apparatus 4 connected to each output port 34.

Note that, as described above, the communication history information is generated by storing information whether the program processing or the like has been executed in the image forming apparatus 4 previously. Thus, if a packet containing a port number of a TCP which is not stored in the communication history information memory 37 is transmitted, the packet is set so as to be evenly subjected to the transfer processing to the image forming apparatus 4 which is a transmission destination. Then, the hub controller 30 grasps the situation of the processing in the image forming apparatus 4 to which the packet is transmitted, and adds the result to the communication history information memory 37 as new communication history information.

Here, FIG. 3 is a diagram illustrating one example of the communication history information stored in the communication history information memory 37 and associated with the MAC address of the image forming apparatus 4 connected to each output port 34.

As shown in FIG. 3, for example, an output port No. 1 (the output port 34A) is connected with the image forming apparatus 4A having the MAC address of A1-B1-C1-D1-E1-F1. In the image forming apparatus 4A, a packet containing a port number of the TCP of $1a$, $2a$, $3a$, $5a$, $6aa$ and $7aaa$ is subjected to the program processing. Thus, the packet containing these port numbers of the TCP is transferred to the image forming apparatus 4A. Further, in the image forming apparatus 4A, a packet containing the port number of the TCP of $8a$, $1aa$, $2aa$ and $4aaa$ is not subjected to the program processing. However, some kinds of responses are executed to the packet. Thus, the hub 3 executes substitutive response processing to the packet containing these port numbers of the TCP, as a substitution for the image forming apparatus 4A. On the other hand, in the image forming apparatus 4A, with respect to a packet containing the port number of the TCP of $3aa$ to $4aa$ and $7aa$ to $1aaa$, no program processing and response are executed. Thus, the hub 3 discards the packet.

In each of the image forming apparatuses 4B and 4C connected to the output port 34B (No. 2) and the output port 34C (No. 3), the similar processing is executed.

Note that the MAC address shown in FIG. 3 is arbitrarily described. Thus, it does not have a particular meaning. An alphabet used in the port number of the TCP shown in FIG. 3 is described as a substitute for a numeral to avoid a misunderstanding that the numeral refers to a specific port number.

Further, in the analysis of information contained in a packet, in addition to the port number of the TCP, other data contained in the packet such as a protocol number contained in an IP header of the packet, and a flag or the like indicating the processing priority of the packet contained in a TOS (Type of Service) field in the IP header may also be used.

Here, as a specific example, the packet discarded by the hub 3 includes a broadband packet and a multicast packet to which the image forming apparatus 4 does not respond.

Further, the packet which is subjected to the substitutive response processing by the hub 3 as a substitution for the image forming apparatus 4 includes, for example, a packet configured by an SNMP, NetBios (Network Basic Input Output System: registered trademark), SMB (Server Message Block), Netware (registered trademark), EtherTalk (registered trademark) or the like.

Further, if the hub 3 grasps information concerning the MAC address of the image forming apparatus 4 and information whether the communication with the image forming apparatus 4 is established, an ARP packet that requires a response of the MAC address from the image forming apparatus 4 connected to each output port 34, a Ping packet that confirms whether communication is normally executed with the image forming apparatus 4 connected to each output port 34, or the like is also the packet for the substitutive response processing.

In order to execute such the substitutive response processing, in the hub 3, the hub controller 30 transmits a predetermined signal to the image forming apparatus 4 connected to each output port 34 in a predetermined frequency to grasp whether the communication with the image forming apparatus 4 is normally executed. The hub controller 30 stores information concerning the situation of the communication with the image forming apparatus 4. Further, when the electric power supply from an electric power source is terminated (off) in the image forming apparatus 4 connected to each output port 34, the hub controller 30 acquires information concerning the electric power-off from the image forming apparatus 4. Thus, the hub controller 30 stores information concerning the state of the operation of the image forming apparatus 4. In this case, in response to the contents of the information concerning the state of the operation of the image forming apparatus 4, the hub controller 30 may properly change the frequency of confirmation whether the communication with the image forming apparatus 4 is normally executed. The hub controller 30 here functions as a communication state determination unit or an electric power termination information acquisition unit.

Further, grasping the information concerning the state of the communication with the image forming apparatus 4 and the information concerning the state of the operation of the image forming apparatus 4 allows a packet which is necessary to transfer to the image forming apparatus 4 other than the ARP packet and the Ping packet for example, to be a target of the substitutive response processing.

Further, with respect to the MAC address of the image forming apparatus 4, the hub controller 30 utilizes the address management table stored in the above-described address management table memory 36.

In the hub 3 according to the present exemplary embodiment, the manager or the like of the communication system 1 may add/change the communication history information stored in the communication history information memory 37. For example, with respect to a packet to be transmitted to the image forming apparatus 4 connected to each output port 34, a packet for transfer, substitutive response and discard may be additionally set as the communication history information. Further, in the communication history information stored in the communication history information memory 37, a packet for transfer, substitutive response and discard may also be changed.

Furthermore, the manager or the like of the communication system 1 may also set any one of, some of, or further all of the transfer processing, substitutive response processing and discard-processing so as to terminate execution of processing.

At this time, the communication history information to be added or changed may also be inputted from the terminal apparatus 6 connected to the hub 3 or from the terminal apparatuses 2A to 2C connected to the network 5. Further, the termination of execution of processing with respect to any one or plural, or further all of the transfer processing, substitutive response processing and discard-processing may also be set from the terminal apparatus 6 or the terminal apparatuses 2A to 2C connected to the network 5. Such input of the setting from the terminal apparatus 6 and the terminal apparatuses 2A to 2C is transmitted to the hub controller 30 via the interface unit 39 or the like, and the hub controller 30 performs setting for the communication history information memory 37, and execution and termination of processing. Thereby the hub controller 30 also functions as an instruction reception unit.

Figure 4:
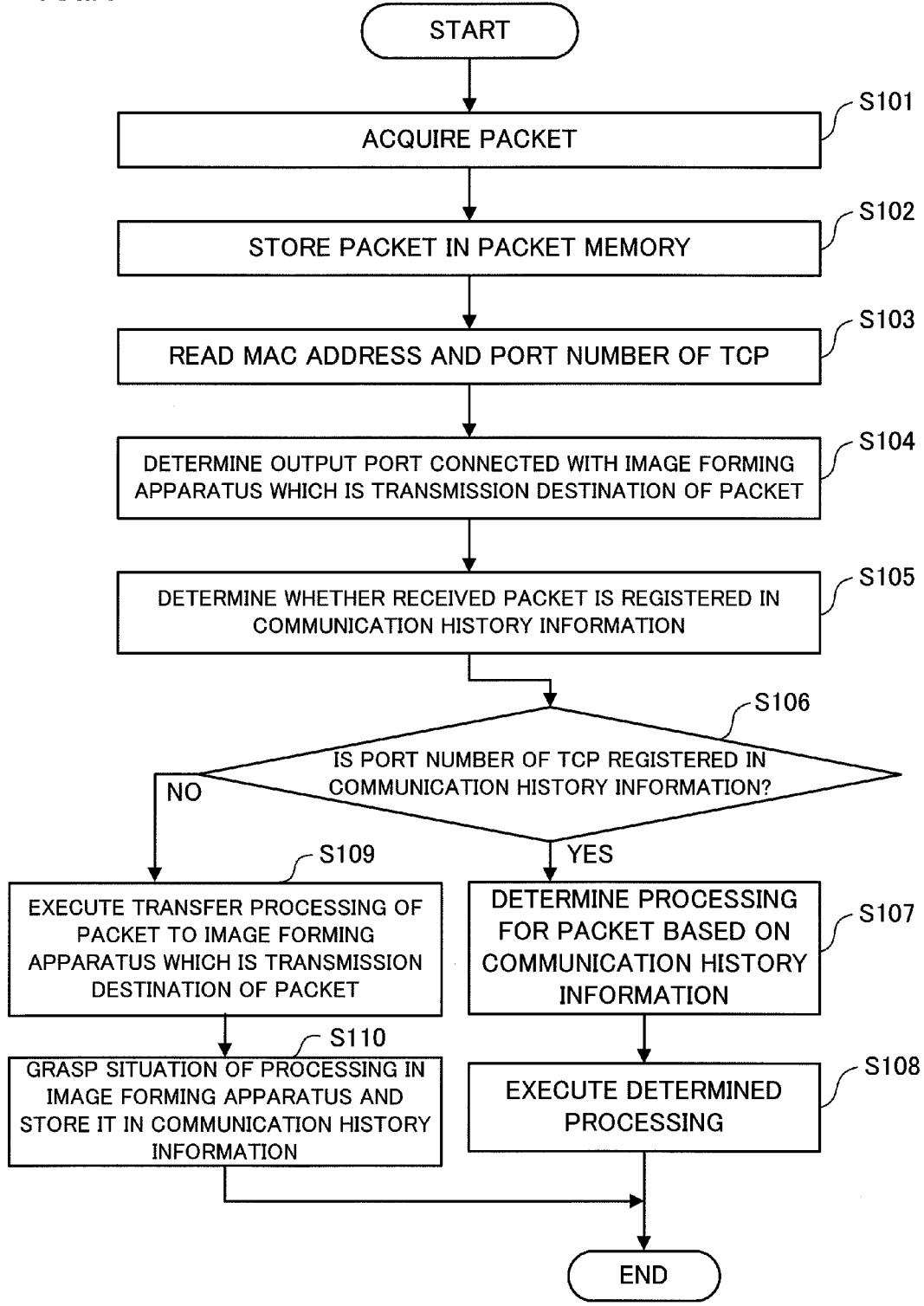
FIG. 4 is a flowchart illustrating the procedure of processing of the packet (packet processing) that is executed by the hub controller.

Then, the procedure of processing of a packet that is executed by the hub controller 30 will be described. FIG. 4 is a flowchart illustrating the procedure of processing of the packet (packet processing) that is executed by the hub controller 30.

As shown in FIG. 4, when the input port 31A receives a packet from the network 5, the hub controller 30 acquires the received packet via the switching unit 32 (S101). Further, the hub controller 30 instructs the switching unit 32 to transmit the received packet to the packet memory 35 so that the packet memory 35 stores the packet (S102).

Subsequently, the hub controller 30 analyzes information contained in the packet acquired in step 101. That is, the hub controller 30 reads an MAC address and a port number of the TCP contained in the packet from the acquired packet (S103).

From the MAC address read in step 103, with referring to the address management table stored in the address management table memory 36, the hub controller 30 determines the output port 34 connected with the image forming apparatus 4 which is a transmission destination of the received packet (S104).

Next, from the MAC address and the port number of the TCP read in step 103, with referring to the communication history information stored in the communication history information memory 37, the hub controller 30 determines whether or not the port number of the TCP contained in the received packet is registered in the communication history information concerning the image forming apparatus 4 which is the transmission destination (S105).

As a result of the determination in step 105, if the hub controller 30 determines that the port number of the TCP contained in the received packet is registered in the communication history information concerning the image forming apparatus 4 which is the transmission destination (S106), the hub controller 30 determines processing based on the communication history information stored in the communication history information memory 37 (S107). That is, the hub controller 30 determines whether to execute the transfer processing of the packet to the image forming apparatus 4 which is the transmission destination based on the communication history information, not to transfer the packet to the image forming apparatus 4 but to execute the response processing for the packet by the hub controller 30, or to execute the discard-processing of the received packet.

The hub controller 30 executes the processing determined in step 107 (S108). Specifically, if the hub controller 30 executes the transfer processing of the packet, the hub controller 30 calls the packet stored in the packet memory 35 from the packet memory 35. Then, the hub controller 30 transmits the packet to the output port 34 determined in step 104 via the switching unit 32. Simultaneously, the hub controller 30 deletes the packet called from the packet memory 35.

Further, if the hub controller 30 executes the response processing to the packet, the hub controller 30 generates a substitutive response signal corresponding to the contents of the received packet. Then, the hub controller 30 transmits the generated substitutive response signal from the substitutive response unit 33 to the origin of transmission of the packet. Furthermore, if the hub controller 30 executes the discard-processing of the received packet, the hub controller 30 discards the packet stored in the packet memory 35 from the packet memory 35.

On the other hand, as the result of determination in step 105, if the port number of the TCP contained in the received packet is determined not to be registered in the communication history information concerning the image forming apparatus 4 which is the transmission destination (S106), the hub controller 30 executes the transfer processing of the received packet to the image forming apparatus 4 which is the transmission destination (S109).

Then, in the image forming apparatus 4 to which the packet is transmitted, the hub controller 30 grasps how the packet is processed, and stores the situation of the processing in the communication history information (S110). That is, if the image forming apparatus 4 executes the program processing such as the print processing for the transmitted packet, the hub controller 30 stores it in the communication history information as the port number of the TCP necessary to be subjected to the transfer processing for the image forming apparatus 4. Further, if the image forming apparatus 4 does not execute the program processing but executes some kinds of responses for the packet, the hub controller 30 stores it in the communication history information as the port number of the TCP that requires response in the image forming apparatus 4. On the other hand, if the image forming apparatus 4 does not execute any program processing and any response, the hub controller 30 stores it in the communication history information as the port number of the TCP to be discarded.

The packet processing in the hub controller 30 as shown in FIG. 4 is executed by a processing program set in the hub controller 30.

Figure 5:
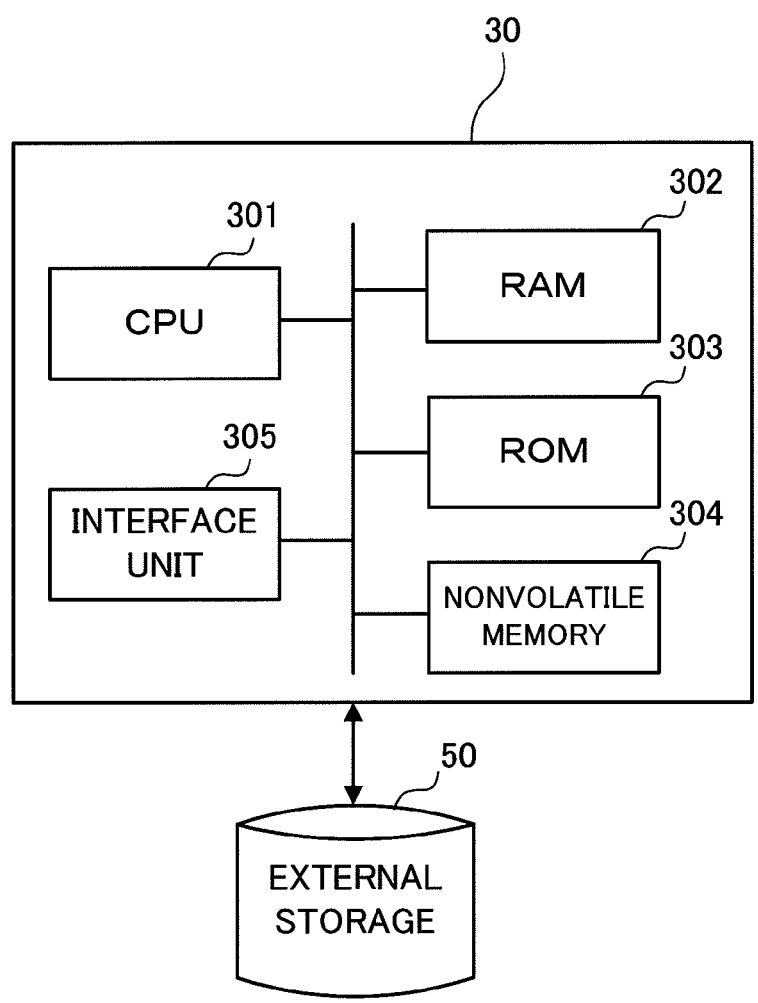
FIG. 5 is a block diagram illustrating the internal configuration of the hub controller according to the exemplary embodiment.

Here, FIG. 5 is a block diagram illustrating the internal configuration of the hub controller 30 according to the exemplary embodiment. As shown in FIG. 5, when executing the above-described packet processing, the hub controller 30 is provided with a CPU (Central Processing Unit) 301 that executes calculation processing according to a predetermined processing program, a RAM (Random Access Memory) 302 which is used as a working memory or the like of the CPU 301, a ROM (Read Only Memory) 303 as one example of a memory in which a processing program or the like executed by the CPU 301 is stored, a nonvolatile memory 304 such as a battery-backed-up SRAM (Static Random Access Memory) and a flash memory that are rewritable and able to hold data even if electric power supply is terminated, and an interface unit 305 that controls an input and output of a signal from and to each unit connected to the hub controller 30.

Further, a processing program to be executed by the hub controller 30 is stored in the external memory 50 that is mounted in the hub 3. The hub controller 30 reads this processing program so that the packet processing in the hub controller 30 according to the present exemplary embodiment is executed.

That is, a program that realizes the function of the above-described hub controller 30 is read from the external memory 50 to the ROM 303 in the hub controller 30. Then, based on the program read in the ROM 303, the CPU 301 executes packet processing. This program is provided by loading, for example, a program stored in a reservation area such as a HDD and a DVD-ROM as the external memory 50 into the ROM 303. Further, as another form, the program is provided in a state in which the program is stored in the ROM 303 in advance. Furthermore, if the rewritable ROM 303 such as an EEPROM is provided, there is a form in which only the program is provided and installed in the ROM 303 after the hub 3 is assembled. Still furthermore, there is a form in which the program is transmitted to the hub controller 30 via a network such as the Internet and installed in the ROM 303 in the hub controller 30.

Figure 6:
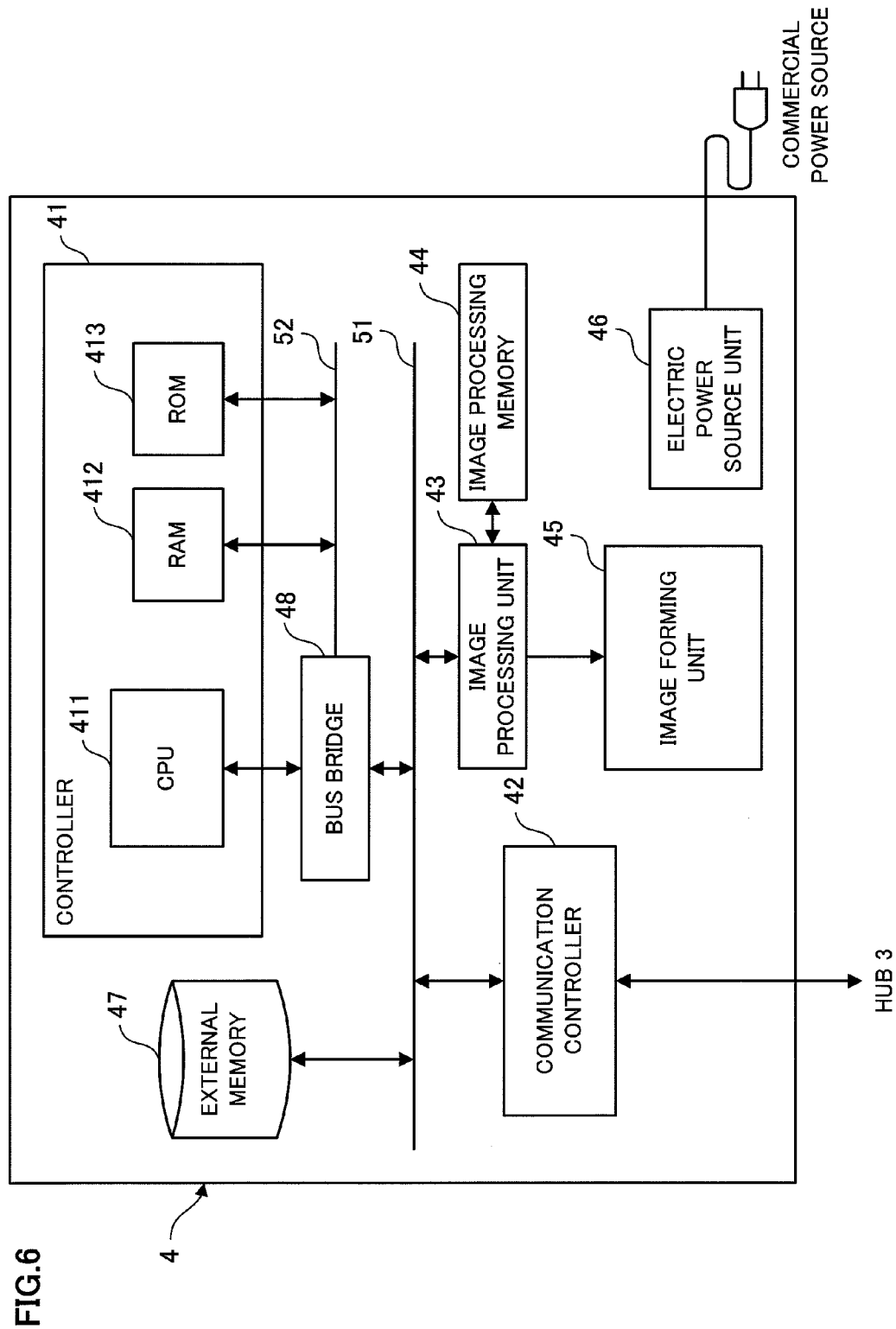
FIG. 6 is a block diagram illustrating the configuration of the image forming apparatus according to the exemplary embodiment.

Next, the configuration of the image forming apparatus 4 connected to the output port 34 will be described. FIG. 6 is a block diagram illustrating the configuration of the image forming apparatus 4 according to the exemplary embodiment. As shown in FIG. 6, the image forming apparatus 4 is one example of an apparatus that executes transmission and reception of a packet to/from the network 5. The image forming apparatus 4 is provided with a controller 41 that controls the operation of the entire image forming apparatus 4 according to a predetermined processing program and a communication controller 42 that controls communication with the hub 3. Further, the image forming apparatus 4 is provided with an image processing unit 43 that executes analysis of print job data transmitted from the terminal apparatus 2 or the like via the hub 3 and various processing for image data contained in the print job data, an image processing memory 44 that is used as a working memory when various kinds of processing are executed in the image processing unit 43, an image forming unit 45 that forms an image on a sheet based on the image data for which various kinds of processing are executed in the image processing unit 43, and an external memory 47 that is realized by, for example, a HDD in which a processing program, image data and the like are recorded. Here, as the image forming unit 45, for example, an electrophotographic image forming engine is used. In addition, the image processing unit 43 and the image forming unit 45 function as an image forming unit by adding other function units as necessary.

Here, the communication controller 42, the image processing unit 43 and the external memory 47 are connected to an external bus 51. Further, the controller 41 is connected to the external bus 51 via a bus bridge 48. Thus, the controller 41, the communication controller 42, the image processing unit 43 and the external memory 47 are connected so as to allow mutual transmission and reception of a signal.

Further, the image forming apparatus 4 includes an electric power source unit 46 that converts, for example, electric power of 100 V supplied from a commercial electric power source into a predetermined electric voltage (e.g. 24V, 12V or 5V). Electric power having a predetermined electric voltage is supplied from the electric power source unit 46 to respective function units.

As shown in FIG. 6, the controller 41 is provided with a CPU 411 as one example of a processing unit that executes processing of calculation or the like when the entire image forming apparatus 4 is controlled, a RAM 412 that is used as a working memory or the like of the CPU 411, and a ROM 413 in which a processing program or the like executed by the CPU 411 is stored. These are mutually connected via an internal bus 52 that is connected to the bus bridge 48.

Further, in the external memory 47, a processing program to be executed by the controller 41 is stored. When the image forming apparatus 4 is started up, the controller 41 reads the processing program into the ROM 413, thus the operation control of the image forming apparatus 4 in the present exemplary embodiment is executed.

Next, an operation mode set by each image forming apparatus 4 in the present exemplary embodiment will be described. In order to enhance electric power saving effect, each image forming apparatus 4 is configured such that "an image forming operation mode", "a standby mode", "a preheating mode" and "a sleep mode" are set as the operation mode.

The image forming operation mode is an operation mode in which an image forming operation is executed for image data or the like. The standby mode is an operation mode in which a state allowing on-demand correspondence is set for an input of the image data or the like. In the image forming operation mode and the standby mode, electric power is supplied from the electric power source unit 46 to all the function units in the image forming apparatus 4.

The preheating mode is an operation mode which is set when, for example, the image data or the like is not inputted during a first period. In the preheating mode, electric power supply is terminated from the electric power source unit 46 to at least the image forming engine (e.g., a function unit that executes the image forming operation, including fixing device or the like) of the image forming unit 45. On the other hand, the electric power supply is continued to the function units other than the image forming engine of the image forming unit 45, such as the controller 41 and the communication controller 42.

Further, the sleep mode is an operation mode that is set in the case when the image data or the like is not inputted during a second period set with a longer time than the first period. In the sleep mode, the electric power supply is continued only from the electric power source unit 46 to the communication controller 42, and the electric power supply is terminated to the other function units including the CPU 411 of the controller 41.

Figure 7:
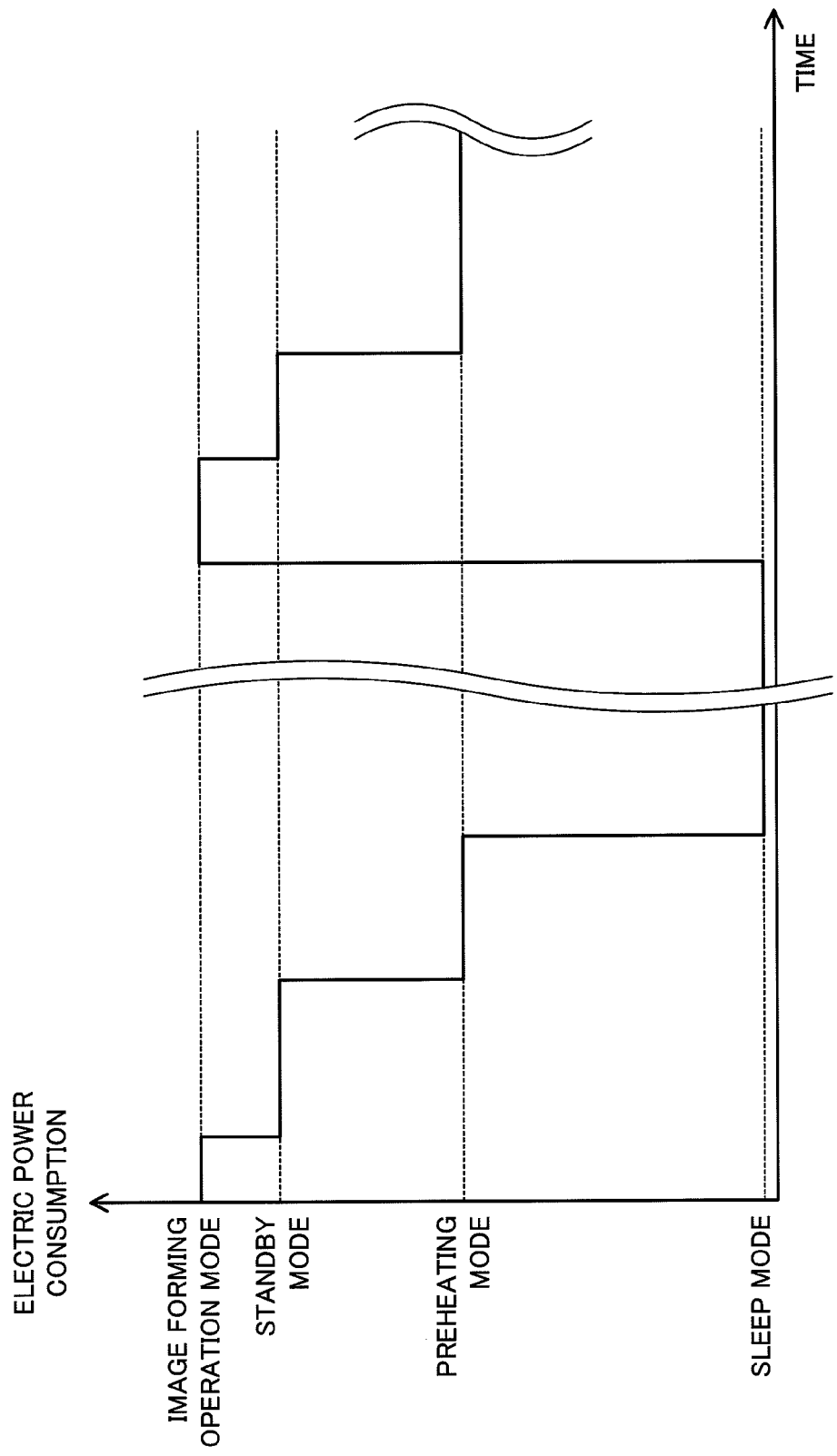
FIG. 7 is a diagram illustrating operation modes set by the image forming apparatus.

FIG. 7 is a diagram illustrating operation modes set by the image forming apparatus 4. As shown in FIG. 7, in the image forming apparatus 4, the image forming operation mode and the standby mode that consume large amount of electric power necessary to maintain the image forming operation, the preheating mode that consumes lower electric power than the image forming operation mode and the standby mode, and returns the image forming mode in a relatively short time, and the sleep mode that consumes extremely small amount of electric power and requires a relatively long time until returning the image formation operation mode are suitably set in accordance with the time until the image data or the like is inputted.

Under general network circumstances, various kinds of packets are transmitted, and many broadcast packets and multicast packets (packet to be simultaneously transmitted to all nodes) are also transmitted. Therefore, a CPU of a conventional controller in an image forming apparatus connected to a network will be turned on every time when all packets including a packet unnecessary for the image forming apparatus itself are received, and the CPU returns from a sleep mode. Once the CPU is returned, the CPU is not able to move to the sleep mode for a while, or may move to an image forming mode or a standby mode. Accordingly, even if a sleep mode which is an ultra low electric power consumption mode is provided so as to turn the CPU off, the electric power saving effect may not often be obtained sufficiently.

In addition to this, in the state in which the sleep mode is set, since the CPU is off, packets may not be received on-demand. Therefore, unreceived packets will be required to be repeatedly transmitted. However, applications which do not transmit the packet repeatedly may exist. In such a case, there is a problem of causing the packet not to be received.

The image forming apparatus 4 that is used in the communication system 1 in the present exemplary embodiment is connected to the network 5 via the hub 3. The hub 3 temporarily stores a packet which is transmitted to the image forming apparatus 4 in the packet memory 35. Further, the hub 3 executes determination processing for determining whether or not the received packet is a packet necessary for the image forming apparatus 4, and transfers only the packet which requires processing in the image forming apparatus 4. Thereby, the CPU 411 of the controller 41 in the state in which the sleep mode is set is activated if only it is required. Consequently, the frequency of the CPU 411 returning from the sleep mode are reduced, and, in addition to the electric power consumption of the CPU 411, the electric power consumption of the entire image forming apparatus 4 may be reduced.

Further, by storing the received packet in the packet memory 35, the occurrence of the unreceived packets is suppressed.

When the image forming apparatus 4 is connected to the output port 34 of the hub 3, the controller 41 transmits an MAC address from the communication controller 42. Further, when the hub 3 requests it to the controller 41, the controller 41 transmits the MAC address in response to the request.

Further, when the controller 41 receives a predetermined signal from the hub 3, the controller 41 replies a predetermined signal from the communication controller 42. Thereby, the controller 41 informs the hub 3 of information indicating establishment of communication between the image forming apparatus 4 and the hub 3.

Furthermore, when the sleep mode is set to the image forming apparatus 4 or when the electric power supply from the electric power source unit 46 is terminated, the controller 41 informs the hub 3 of the situation from the communication controller 42. Thus, the hub 3 grasps the operation situation of the image forming apparatus 4.

As described above, in the communication system 1 according to the present exemplary embodiment, the hub 3 that processes a packet transmitted from the network 5 is arranged between an apparatus such as the image forming apparatus 4 and the network 5, as a relay unit. The hub 3 is configured so as to execute the determination processing for determining whether or not the packet is necessary to be transferred to an apparatus such as the image forming apparatus 4 and so as to transfer only the packet which requires processing in the image forming apparatus 4. Thus, in the CPU 411 of the image forming apparatus 4, the frequency of the CPU 411 returning from the sleep mode is reduced, and, in addition to the electric power consumption of the CPU 411, the electric power consumption of the entire image forming apparatus 4 may be reduced.

Further, since the received packet is stored in the packet memory 35, the reception failure of the packets is suppressed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication system including:
   an image forming apparatus that receives a signal having image data from an external apparatus, processes the received image data, and outputs the processed image data to a recording medium; and
   a relay apparatus that relays signals between the external apparatus and the image forming apparatus, the relay apparatus comprising:
   a transmission and reception unit that receives a signal sent from the external apparatus to the image forming apparatus, and relays the received signal to the image forming apparatus;
   an analysis unit that determines that a destination of the received signal is the image forming apparatus; and
   a determination unit that determines that the received signal does not contain image data to be processed by the image forming apparatus in response to the analysis unit determining that the destination of the received signal is the image forming apparatus,
   wherein the transmission and reception unit withholds the relaying of the received signal to the image forming apparatus in response to the determination unit determining that the received signal does not contain image to be processed by the image forming apparatus; and
   wherein the withholding of the relaying apparatus comprises of one of responding to a sender of the received signal on behalf of the image forming apparatus without forwarding the received signal to the image forming apparatus, and deleting the received signal without forwarding the received signal to the image forming apparatus.

2. The communication system according to claim 1, wherein the relay apparatus further comprises:
   a memory that stores a record of a previous signal previously sent to the image forming apparatus, the record comprising data stored in the previous signal,
   wherein the determination unit determines that data in the received signal matches data in the previous signal, and
   wherein the transmission and reception unit relays the received signal to the image forming apparatus in response to the determination unit determining that the data in the received signal matches the data in the previous signal.

3. The communication system according to claim 1,
   wherein the relay apparatus further comprises a communication state determination unit that determines whether one of a state of communication between the image forming apparatus and the relay apparatus is in a state where the communication is established and a state where the communication is not established, and
   the transmission and reception unit responds to sender of the received signal on behalf of the image forming apparatus without forwarding the received signal to the image forming apparatus in response to the communication state determination unit determining that the communication between the image forming apparatus and the relay apparatus is not established.

4. The communication system according to claim 1,
   wherein relay apparatus further comprises an electric power termination information acquisition unit that acquires, from the image forming apparatus, power termination information indicating termination of electric power supply from an electric power source in the image forming apparatus, and
   the transmission and reception unit responds to sender of the received signal on behalf of the image forming apparatus without forwarding the received signal to the image forming apparatus in response to the electric power termination information acquisition unit acquiring the power termination information indicating termination of electric power supply.

5. The communication system according to claim 4, wherein the information acquired by the electric power termination information acquisition unit also indicates continuation of electric power supply at least to a communication controller in the apparatus.

6. The communication system according to claim 1, wherein the relay apparatus further comprises an instruction reception unit that receives a user input, and
   the determination unit determines that the received signal does not contain image data to be processed by the image forming apparatus based on the user input received by the instruction reception unit.

7. A relay apparatus for controlling data transfer between an image forming apparatus and an external apparatus, the relay apparatus comprising:
   a transmission and reception unit that receives a signal sent from the external apparatus to the image forming apparatus, and relays the received signal to the image forming apparatus;
   an analysis unit that determines that a destination of the received signal is the image forming apparatus; and
   a determination unit that determines that the received signal does not contain image data to be processed by the image forming apparatus in response to the analysis unit determining that the destination of the received signal is the image forming apparatus,
   wherein the transmission and reception unit withholds the relaying of the received signal to the image forming apparatus in response to the determination unit determining that the received signal does not contain image to be processed by the image forming apparatus; and
   wherein the withholding of the relaying apparatus comprises of one of responding to a sender of the received signal on behalf of the image forming apparatus without forwarding the received signal to the image forming apparatus, and deleting the received signal without forwarding the received signal to the image forming apparatus.

8. The communication system according to claim 7,
   further comprising a communication state determination unit that determines whether one of a state of communication between the image forming apparatus and the relay apparatus is in a state where the communication is established and a state where the communication is not established, and
   wherein the transmission and reception unit responds to sender of the received signal on behalf of the image forming apparatus without forwarding the received signal to the image forming apparatus in response to the communication state determination unit determining that the communication between the image forming apparatus and the relay apparatus is not established.

9. The communication system according to claim 7,
further comprising an electric power termination information acquisition unit that acquires, from the image forming apparatus, power termination information indicating termination of electric power supply from an electric power source in the image forming apparatus,
wherein the transmission and reception unit responds to sender of the received signal on behalf of the image forming apparatus without forwarding the received signal to the image forming apparatus in response to the electric power termination information acquisition unit acquiring the power termination information indicating termination of electric power supply.

10. A method of relaying data between an imaging forming apparatus and an external apparatus at a relay apparatus, the method comprising:
receiving, by the relay apparatus, a signal transmitted from the external apparatus to the image forming apparatus;
determining that a destination of the received signal is the image forming apparatus;
determining that the received signal does not contain image data to be processed by the image forming apparatus;
withholding, by the relay apparatus, relaying the signal to the image forming apparatus in response the determining that the received signal does not contain image data to be processed by the image forming apparatus; and
wherein the withholding of the relaying apparatus comprises of one of responding to a sender of the received signal on behalf of the image forming apparatus without forwarding the received signal to the image forming apparatus, and deleting the received signal without forwarding the received signal to the image forming apparatus.

11. A computer readable recording medium storing program, which when executed by a computer, causes the computer to execute a method of relaying data between an image forming apparatus and an external apparatus at a relay apparatus the process comprising:
receiving, by the relay apparatus, a signal transmitted from the external apparatus to the image forming apparatus;
determining that a destination of the received signal is the image forming apparatus;
determining that the received signal does not contain image data to be processed by the image forming apparatus;
withholding, by the relay apparatus, relaying the signal to the image forming apparatus in response the determining that the received signal does not contain image data to be processed by the image forming apparatus; and
wherein the withholding of the relaying apparatus comprises of one of responding to a sender of the received signal on behalf of the image forming apparatus without forwarding the received signal to the image forming apparatus, and deleting the received signal without forwarding the received signal to the image forming apparatus.

12. The computer readable medium according to claim 11, wherein the method further comprises:
storing a record of a previous signal previously sent to the image forming apparatus, the record comprising data stored in the previous signal;
determining that data in the received signal matches data in the previous signal; and
relaying the received signal to the image forming apparatus in response determining that the data in the received signal matches the data in the previous signal.

13. The computer readable medium according to claim 11, wherein the method further comprises:
determining whether one of a state of communication between the image forming apparatus and the relay apparatus is in a state where the communication is established and a state where the communication is not established, the apparatus being a destination of the signal,
wherein the withholding comprises responding to a sender of the received signal on behalf of the image forming apparatus without forwarding the received signal to the image forming apparatus in response to determining the state where the communication is not established.

14. The communication system according to claim 11, wherein the method further comprises:
acquiring, from the image forming apparatus, power termination information indicating termination of the electrical power supply from an electric power source in the image forming apparatus,
wherein the withholding comprises responding to a sender of the received signal on behalf of the image forming apparatus without forwarding the received signal to the image forming apparatus in response to acquiring power termination information indicating termination of electric power supply.

* * * * *